UNITED STATES PATENT OFFICE.

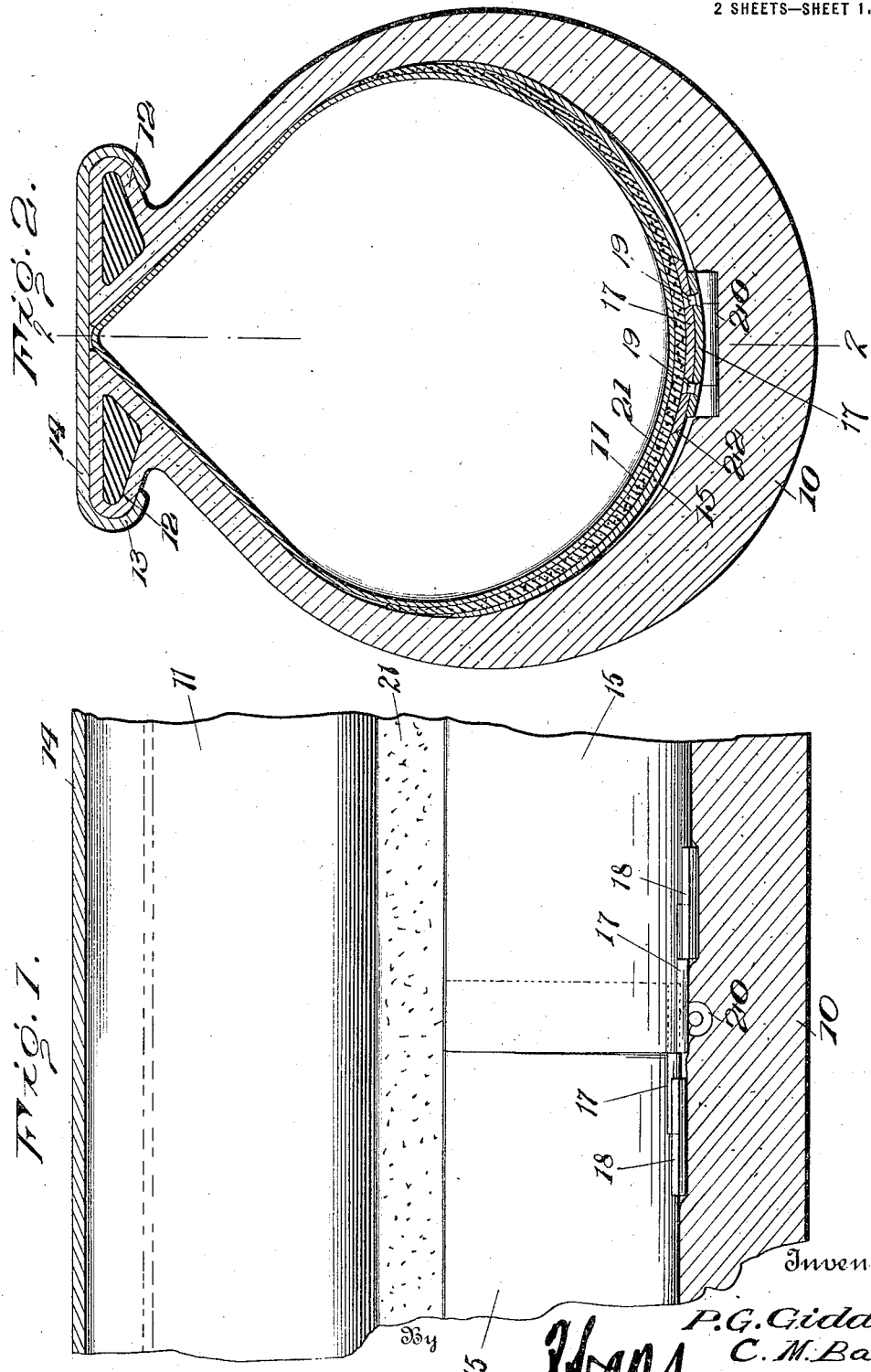

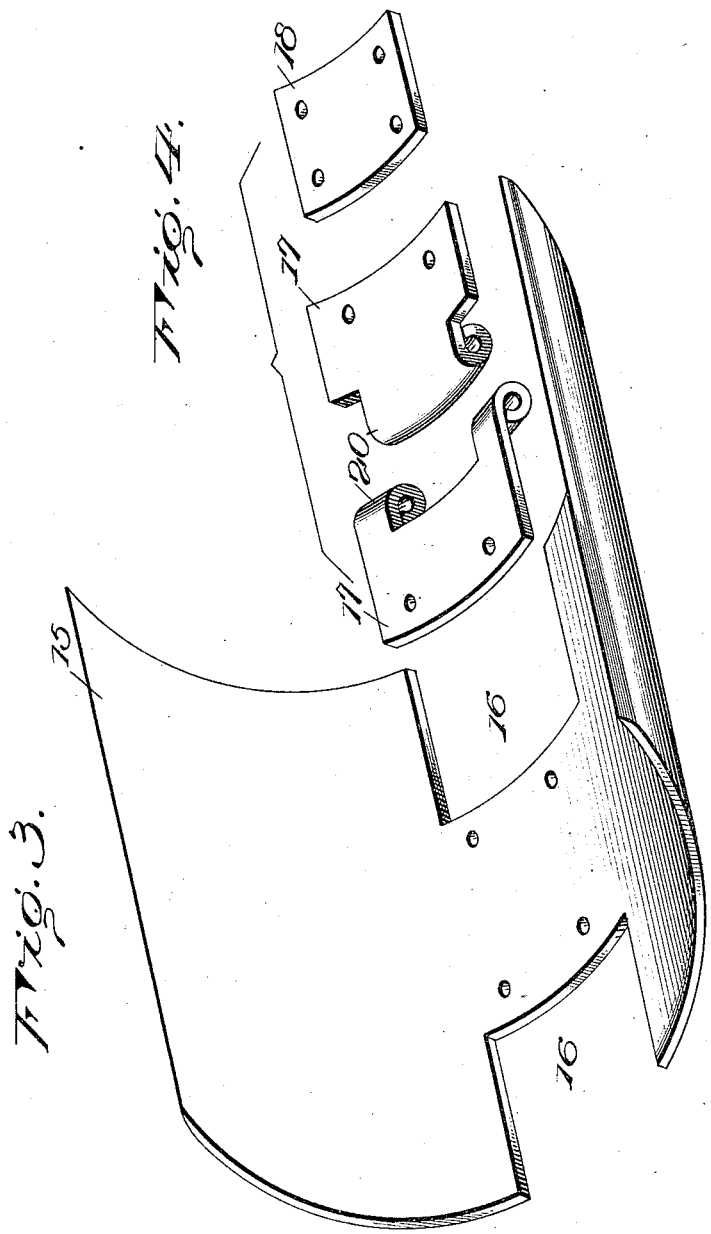

PERRY G. GIDDENS AND CURTIS M. BASS, OF COLUMBUS, GEORGIA.

INNER-TUBE ARMOR FOR PNEUMATIC TIRES.

1,263,054.

Specification of Letters Patent.

Patented Apr. 16, 1918.

Application filed May 22, 1917. Serial No. 170,229.

*To all whom it may concern:*

Be it known that we, PERRY G. GIDDENS and CURTIS M. BASS, citizens of the United States, residing at Columbus, in the county of Muscogee and State of Georgia, have invented certain new and useful Improvements in Inner-Tube Armors for Pneumatic Tires, of which the following is a specification.

This invention relates to improvements in armor devices for the inner tubes of pneumatic tires to protect the inner tube from puncture, and has for one of its objects to provide a device of this character including a plurality of armor plates overlapping at their confronting ends and inserted between the casing and the inner tube and effectually protecting the latter from puncture.

Another object of the invention is to provide a device of this character including a plurality of armor plates having longitudinally directed recesses and hingedly united members secured to the plates within the recesses, whereby the device is caused to yield in all directions to the movements of the casing and its flexibility materially increased.

Another object of the invention is to provide a device of this character which may be readily applied to pneumatic tires of various forms and sizes without structural change in the casing or the inner tube and without material structural change in the attachment.

With these and other objects in view, the invention consists in certain novel features of construction, as hereinafter shown and described and then specifically pointed out in the claims; and in the drawings illustrative of the preferred embodiment of the invention—

Figure 1 is a side elevation of a portion of the inner tube of a pneumatic tire with the improved armor device applied and with the casing and rim in longitudinal section;

Fig. 2 is a transverse section on the line 2—2 of Fig. 1;

Fig. 3 is a detached perspective view of one of the protecting or armor plates;

Fig. 4 represents the coupling elements whereby the armor plates are flexibly united and supported.

Corresponding and like parts are referred to in the following description and indicated in all the views of the drawings by the same reference characters.

The improved device comprises a plurality of armor plates of sheet metal, preferably steel, curved transversely to conform substantially to the outline of the outer portion of the inner tube of a pneumatic tire and of the interior of the casing and overlapping at their confronting ends. A sufficient number of the armor plates are employed to entirely encompass the interior of the casing and the exterior of the inner tube. The armor plates will be curved to correspond to the relative sizes of the inner tube and the casing, and will be varied as the casing and tube are increased or decreased in size.

The casing of the tire is represented at 10 and the inner tube at 11, the casing having the usual ribs 12 to engage the clencher rims 13 of the wheel rim 14, as shown more clearly in Fig. 2. The armor plates are represented at 15 and overlap at their confronting ends as indicated in Fig. 1. Each of the armor plates 15 is provided with a longitudinally directed recess shown at 16 in Fig. 3, and fitting within each recess is a smaller plate 17 and held in place by a clamp plate 18 which bears over the outer face of the armor plate 15 and the adjacent portion of the plate 17 and secured thereto by rivets or like fastening devices 19. The outer edges of the plates 17 of each pair of the protecting members 15 are hingedly united as shown at 20. The hinged portions projecting outwardly so that the inner faces of the armor plates 15 and the hinge plates 17 are flush or without projections. The sides of the recesses 16 are of greater length than the plates 17, so that the overlapping portions of the main plates 15 extend beyond the hinge portion 20, thus effectually preventing the formation of gaps or openings between the contiguous and overlapping edges of the armor plates under the movements of the tire casing. By this arrangement also the central portions of the armor plates are flexible or yieldable independently of the side portions thereby materially increasing the flexibility over all parts of the casing and armor. Disposed between the armor plates 15 and the hinge plates 17 and the inner tube 11 is a strip of yieldable material such as asbestos paper or the like, represented at 21, to protect the inner tube from contact with the plates. The protecting member 21 is wider transversely than the armor plates 15 so that it projects at its edges beyond the edges of the armor plates, and thus prevents any direct contact between the inner tube and the armor plates. The confronting edges of the members 15—17 are beveled as shown at 22 in Fig. 2, to prevent displacement between the parts when pressure is applied. By this simple means the protecting or armor plates 15 are flexibly united and thus yield to the movements of the casing and the inner tube when weight is applied to the axle, or when the tire passes over obstructions or inequalities in the road. By this arrangement of the parts a substantially smooth or regular contact surface is produced between the inner tube and the tire casing. The improved device is applied only to the outer or exposed portions of the inner tube and of the casing. The apertures for the rivets 18 are countersunk in both the members 17 and 18 so that no part of the rivet projects beyond the general surface of the armor plates or the supporting plates 18.

By employing asbestos material for the protecting member 21 all danger from heat is prevented as the asbestos is a non-conductive material. By this means the inner tube is protected from heat which may be accumulated or absorbed by the casing in hot weather. Another advantage of the device is the fact that the plates 17 together with the hinge devices 20 may be constructed of harder metal than the body portions of the plates 15, for instance, tempered steel, and thus enabled to withstand the greater strain to which they will be subjected when in use.

Having thus described the invention, what is claimed as new is:

1. A guard for pneumatic tires comprising a plurality of sheet metal armor plates curved transversely to conform to the tire casing and overlapping at their confronting ends, the ends of said armor plates having confronting recesses, filler members hingedly united and engaging in the recesses, and less in length than the depths of the recesses, whereby the outer and overlapping portions of the armor plates extend beyond the hingedly united ends of the filler members, and clamp members united respectively to the filler members and to the armor plates.

2. A guard for pneumatic tires comprising a plurality of sheet metal armor plates curved transversely to conform to the tire casing and overlapping at their confronting ends, the ends of said armor plates having confronting recesses, filler members hingedly united and engaged in the recesses, and means for uniting the filler members to the armor plates.

3. The combination with a tire including the casing and inner inflatable tube, of a guard comprising a plurality of sheet metal armor plates curved transversely to conform to the tire casing and overlapping at their confronting ends and disposed between the casing and inner tube, the ends of said armor plates having confronting recesses, filler members hingedly united and engaging in the recesses and less in length than the depths of the recesses, whereby the outer and overlapping portions of the armor plates extend beyond the hingedly united ends of the filler members, and clamp members united respectively to the filler members and to the armor plates.

In testimony whereof we affix our signatures.

PERRY G. GIDDENS. [L. S.]
CURTIS M. BASS. [L. S.]

Copies of this patent may be obtained for five cents each, by addressing the "Commissioner of Patents, Washington, D. C."